United States Patent
Deshpande et al.

(10) Patent No.: US 7,747,802 B2
(45) Date of Patent: Jun. 29, 2010

(54) SIMULTANEOUS CONTROL OF MULTIPLE I/O BANKS IN AN I2C SLAVE DEVICE

(75) Inventors: Amrita Deshpande, Chandler, AZ (US); Alma Anderson, Chandler, AZ (US); Jean-Marc Irazabal, Santa Clara, CA (US); Stephen Blozis, Morgan Hill, CA (US); Paul Boogaards, Cary, NC (US)

(73) Assignee: NXP B.V., Eindhoven (NL)

( * ) Notice: Subject to any disclaimer, the term of this patent is extended or adjusted under 35 U.S.C. 154(b) by 443 days.

(21) Appl. No.: 11/913,063

(22) PCT Filed: May 1, 2006

(86) PCT No.: PCT/IB2006/051362
§ 371 (c)(1),
(2), (4) Date: Oct. 29, 2007

(87) PCT Pub. No.: WO2006/117749
PCT Pub. Date: Nov. 9, 2006

(65) Prior Publication Data
US 2008/0215780 A1   Sep. 4, 2008

Related U.S. Application Data

(60) Provisional application No. 60/676,361, filed on Apr. 29, 2005.

(51) Int. Cl.
*G06F 13/00* (2006.01)
(52) U.S. Cl. .................................. 710/110; 709/236
(58) Field of Classification Search ................ 709/230, 709/236, 208–209; 710/110; 700/3
See application file for complete search history.

(56) References Cited

U.S. PATENT DOCUMENTS

| 5,031,095 A | * | 7/1991 | Hara et al. ................. 709/236 |
| 6,799,233 B1 | | 9/2004 | Deshpande et al. |
| 7,080,266 B2 | * | 7/2006 | D'Angelo et al. ........... 713/300 |
| 2005/0114577 A1 | * | 5/2005 | Beckhoff et al. ............ 710/110 |

OTHER PUBLICATIONS

"AN469 I2C/SMBus General Purpose I/O Expanders" Philips Application Note, Jan. 20, 2005.
Deshpande, Amrita "Design of a Behavioral (Register Transfer Level, RTL) Model of the Inter-Integrated Circuit or I2C-Bus Master-Slave Interface" Master's Thesis of Amrita Deshpande, University of New Mexico, 1999.

* cited by examiner

*Primary Examiner*—Clifford H Knoll

(57) ABSTRACT

Consistent with one example embodiment, communications systems, using a serial data transfer bus having a serial data line and a clock line used to implement a communications protocol, incorporate programmable loading of a logic value into parallel slave device registers. The communications system includes a slave device having two or more registers, each register having two or more bits, each register configured to load data therein received in accordance with the communications protocol over the data transfer bus in a first configuration, and to load a single logic value into the plurality of bits in a second configuration. A programmable configuration register is configured to be programmed, in accordance with the communications protocol over the data transfer bus, to select two or more of the registers in the second configuration.

17 Claims, 4 Drawing Sheets

SIMULTANEOUS CONTROL OF MULTIPLE I/O BANKS IN AN I2C SLAVE DEVICE

The present invention is directed generally to communication devices and methodologies, and more particularly, to methods and arrangements for programming multiple banks of I/O in an I2C slave device simultaneously with the same logic value.

The Inter-Integrated Circuit (I2C) bus developed by Philips Corporation allows integrated circuits to communicate directly with each other via a simple bi-directional 2-wire bus (plus power and ground). A device connects to each of the two wires on the bus, one serial data line (SDA) for the communication of data, and the other serial clock line (SCL) for the control and synchronization of the communication of data between the devices. Each device is connected in parallel to each of the other devices, and each of the bus lines, SDA and SCL, function as a wired-AND of all the lines on the bus. The output of each device is configured as an open-collector/open-drain device, and one or more pull-up resistors maintain a 'soft' logic high value on the bus while the bus is in the quiescent state. When a device desires access to the bus, the device pulls the bus to a logic low value, via the open-collector/open-drain device that is placed in a conductive state to ground potential.

Each device that is connected to an I2C bus is identifiable by an address, and can operate as either a transmitter or a receiver, or both. Data transfers are effected using a master-slave communications protocol. A master is a device that initiates a data transfer and generates the clock signals to permit the transfer; any device that is addressed is considered a slave for this transfer. The data transfer can be initiated by a master to either transmit data to the slave (herein designated as write), or to request data from the slave (herein designated as read). For example, an output device, such as a display screen, is typically not able to initiate a data transfer, and therefore would be configured to only operate as a slave device. A microprocessor, on the other hand, will typically be configured to operate as either a master or a slave, as the situation demands.

In a quiescent state, both the SDA and SCL bus lines are in the logic-high state (herein designated as high, or logic state of 1). A master initiates a data transfer by asserting a transition to a logic-low state (herein designated as low, or logic state of 0) on the SDA line while the SCL line is high; this is termed a START condition. Thereafter, the master toggles the SCL line to control the synchronization of the data transfer; data value changes occur on the SDA line when the SCL clock is low, and the state of the SDA line is considered valid only when the SCL clock is high.

Multiple STARTs can be asserted to effect a series of data transfers within the same transfer session. Generally, each data transfer requires an acknowledgement from the addressed recipient of the data transfer. To terminate the data transfer, the host asserts a low-to-high transition on the SDA line while the SCL clock is high; this is termed a STOP condition. Thereafter, any device may assume control of the bus as a master by asserting a high-to-low transition on the SDA line, as above. Note that, for ease of reference, the term assert is used herein for effecting, or attempting to effect, the specified logic state. In the example of a transition to a logic-high state, this is typically provided by a release of the bus from a forced pull-down state by the asserting device. This assertion of a logic-high state allows the aforementioned pull-up devices on the bus to bring the bus to a logic-high state, unless another device is also forcing the pull-down state.

The general format of an I2C data transfer involves signals on an SDA line and an SCL line forming the I2C bus. A START condition (S) corresponds to high-to-low transition of the signal on the SDA line while the SCL line is high. After the START, the host transmits an address, nominally seven bits, followed by a read/write-not indicator. After transmitting the address and the direction of data transfer (R/W-), the host releases the SDA line, allowing it to rise to a logic-high level. If a slave device recognizes its address, the slave device transmits an acknowledge signal (ACK) by pulling the bus low. The absence of a low signal when the host releases the SDA line, therefore, indicates a non-acknowledgement (NAK). If the address is acknowledged, via a low at SDA, the transmitting device transmits the data. If the direction of data transfer is a "read" relative to the host, then the slave device is the transmitting device; if the direction is a "write" relative to the host, then the master device is the transmitting device. The transmitting device releases control of the SDA line, and the receiving device acknowledges the receipt of the data by asserting a logic-low value on the SDA line. If the data is acknowledged, the transmitter sends additional data. This process continues until the entirety of the data is communicated, or until a transmitted data item is not-acknowledged. The master can subsequently reassert a START signal, and repeat the process above, or, can assert a STOP signal (P) to terminate this data-transfer session.

The above interface protocol can be implemented in a variety of ways. To minimize the development time for programming or designing an I2C interface, a variety of general-purpose interface schemes have been published. "DESIGN OF A BEHAVIORAL (REGISTER TRANSFER LEVEL, RTL) MODEL OF THE INTER-INTEGRATED CIRCUIT OR I2C-BUS MASTER-SLAVE INTERFACE", Master's Thesis of Amrita Deshpande, University of New Mexico, 1999, discloses an I2C master interface and slave interface that is intended to be embodied in an I2C device, and is incorporated by reference herein. By providing a verified I2C interface, system designers need not address the details of the I2C specification and protocol. Both the master and the slave interfaces of this thesis are state-machine based. State-machine based systems and methods are further described in U.S. Pat. No. 6,799,233, which is hereby incorporated herein by reference.

Various aspects of the present invention are directed to methods and arrangements for programming multiple banks of I/O in an I2C slave device simultaneously with the same logic value using a serial bus in a manner that addresses and overcomes the above-mentioned issues.

Consistent with one example embodiment, the present invention is directed to a communications system that uses an I2C serial data transfer bus that has a serial data line and a clock line used to implement a communications protocol. The communications system includes a slave device having two or more interface port registers, each interface port register having two or more bits, each interface port register configured to load data therein received in accordance with the communications protocol over the data transfer bus in a first configuration, and to load a single logic value into the plurality of bits in a second configuration. A programmable configuration register is configured to be programmed, in accordance with the communications protocol over the data transfer bus, to select two or more of the interface port registers for loading of the single logic value into the two or more of bits of the selected interface port registers in the second configuration.

Consistent with another example embodiment, the present invention is directed to a method involving programming a configuration register in the slave device, in accordance with the communications protocol over the data transfer bus, to select at least two interface port registers from two or more selectable interface port registers. A logic value is selected, and the logic value is loaded into each of the selected at least two interface port registers concurrently.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

The invention may be more completely understood in consideration of the following detailed description of various embodiments of the invention in connection with the accompanying drawings, in which.

Figure 3:
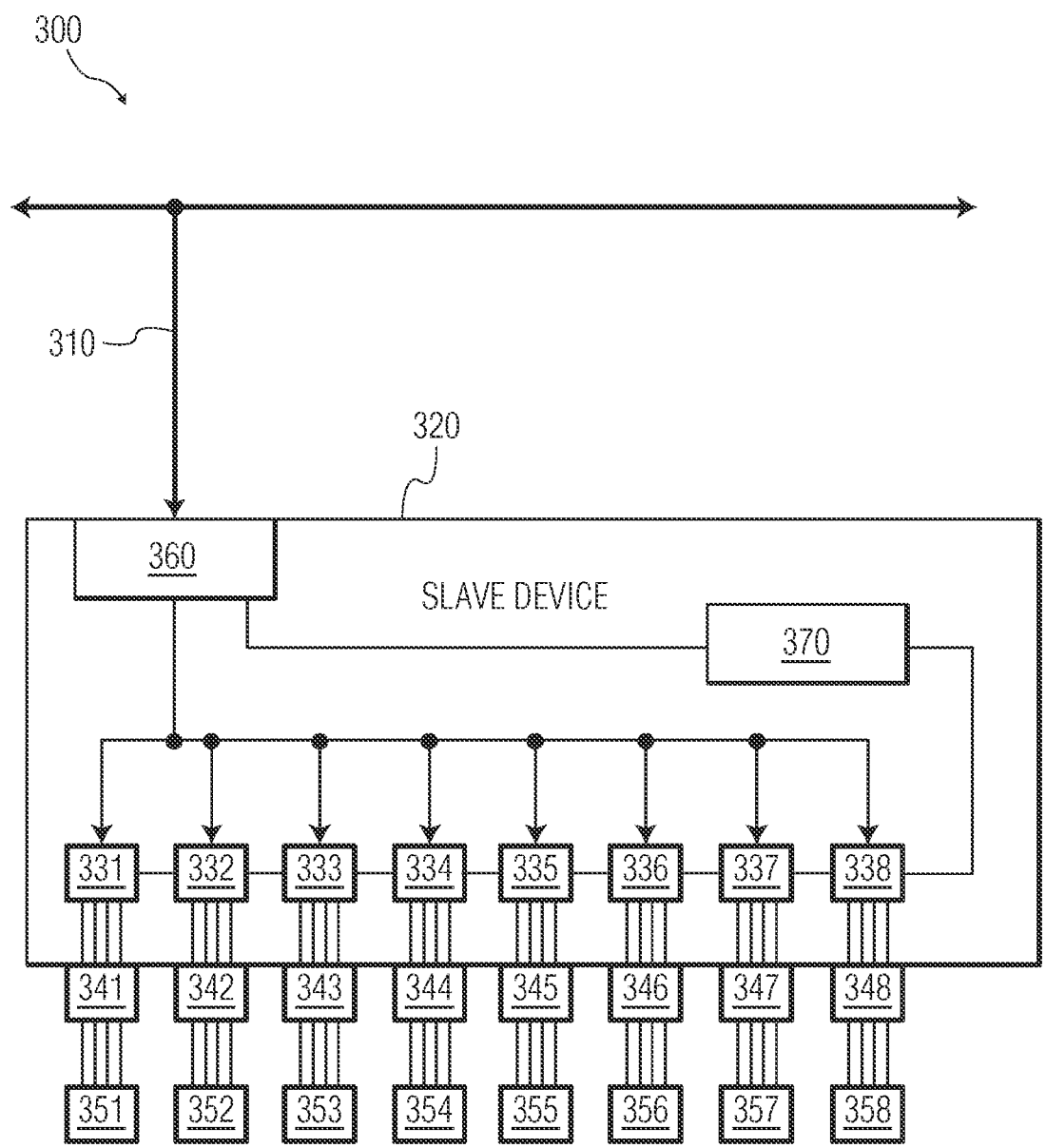
Figure 4:
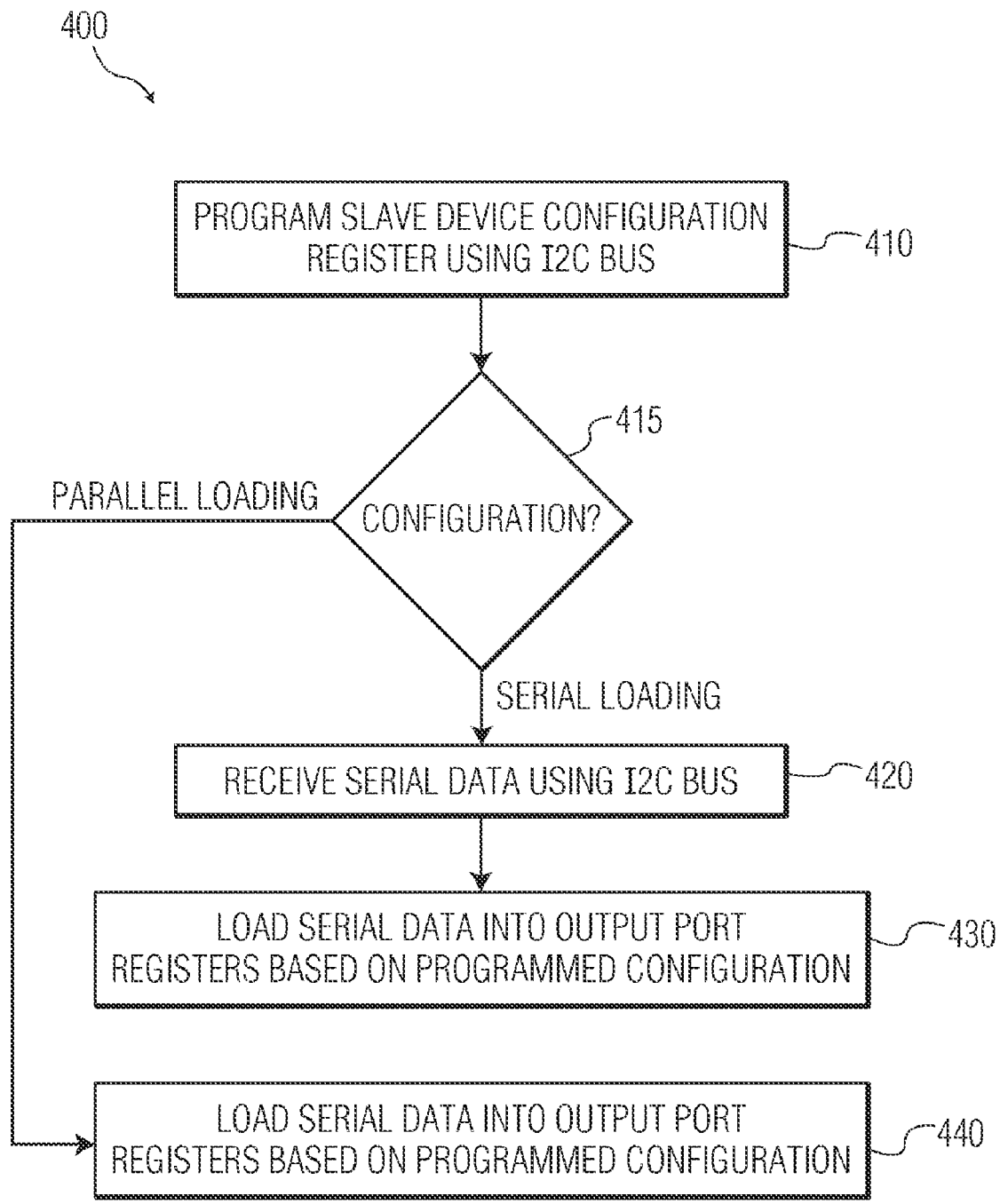

FIG. 3 is a block diagram of a system implementing programming of multiple banks of I/O in an I2C slave device simultaneously with the same logic value in accordance with embodiments of the present invention; and FIG. 4 is a flow chart of a method for programming multiple banks of I/O in an I2C slave device simultaneously with the same logic value in accordance with embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is generally applicable to methods and arrangements for programming multiple banks of I/O in an I2C slave device simultaneously with the same logic value. The invention has been found to be particularly advantageous for Inter Integrated Circuit (I2C) serial data communications busses, but is also advantageous for other busses and communications protocols, such as system management bus (SMBus) architectures and/or protocols or other serial data communications systems. For purposes of illustration, and not of limitation, the invention will be described in the context of an I2C bus having a master device controlling communication to a slave device.

Masters control the communication with I2C slaves on the I2C bus architecture. I2C slaves find numerous applications in fields ranging from cell phones, PDAs and SmartPhones to LCD TVs, Medical Equipment, Gaming, and other applications. One particular application of an I2C slave is as a General Purpose Input/Output (GPIO) device. In this type of device, there are a number of multi-function pins that can be used as inputs or outputs. When used as inputs, these pins typically indicate the state of certain signals that are being monitored.

A particular application of an I2C slave is as a General Purpose Input/Output (GPIO). In this type of device, there are a number of multi-function pins that can be used as inputs or outputs. When configured as outputs, these devices can be used in a system for e.g. to drive many light emitting diodes (LEDs). These outputs are typically divided into banks and programmed individually via the I2C bus.

Consistent with one example embodiment, communications systems, using a serial data transfer bus having a serial data line and a clock line used to implement a communications protocol, incorporate programmable loading of a logic value into parallel slave device registers concurrently. The communications system includes two or more banks of output drivers that output data resident in associated output port registers. Each slave device receives serial data and loads the data into the output port registers. A programmable register in each slave device is programmed, using the communications protocol, to select one or more slave device configurations. At least two output port registers are coupled in parallel. One of the selectable slave device configurations causes the output port registers to be loaded in parallel, and another of the selectable slave device configurations causes the output port registers to be loaded with serial data from the I2C bus one at a time.

In an example embodiment, the present invention incorporates programmable loading of a logic value into parallel slave device registers by programming a configuration register via the I2C bus. For example, Table 1 illustrates an example of a programmable configuration register that may be provided in a slave device in accordance with the present invention. Table 1 illustrates an 8 bit word programmed into the register.

TABLE 1

| | Configuration Register | | | | | | | |
|---|---|---|---|---|---|---|---|---|
| Bit | BSEL | X | X | $B_4$ | $B_3$ | $B_2$ | $B_1$ | $B_0$ |
| Default | 1 | 0 | 0 | 0 | 0 | 0 | 0 | 0 |

This register allows all the banks of the output port registers or a selection of banks to be loaded with the same data.

Bits $B_0$ to $B_4$ control the logic level to be applied to Bank0 through Bank4, respectively.

$B_x$=0: All the outputs in the corresponding Bank X are loaded with 0's.

$B_x$=1: All the outputs in the corresponding Bank X are loaded with 1's.

Bits 5 and 6 are reserved for other control functions, and are loaded with zeroes in this example.

BSEL is the filter bit that allows loading of some banks only and not the others.

BSEL=0: When $B_x$=0, all the outputs in Bank X are loaded with 0s.
  When $B_x$=1, all the outputs in Bank X are loaded with values from their output port registers.
BSEL=1: When $B_x$=1, all the outputs in Bank X are loaded with 1s.
  When $B_x$=0, all the outputs in Bank X are loaded with values from their output port registers.

Slave devices that programmably load multiple banks of I/O simultaneously with the same logic value, using a serial bus, may be configured as general purpose Input/Output (GPIO) devices, or other slave devices. The communication system may conform to I2C, SMBus, and/or other serial communication specifications.

Figure 1:
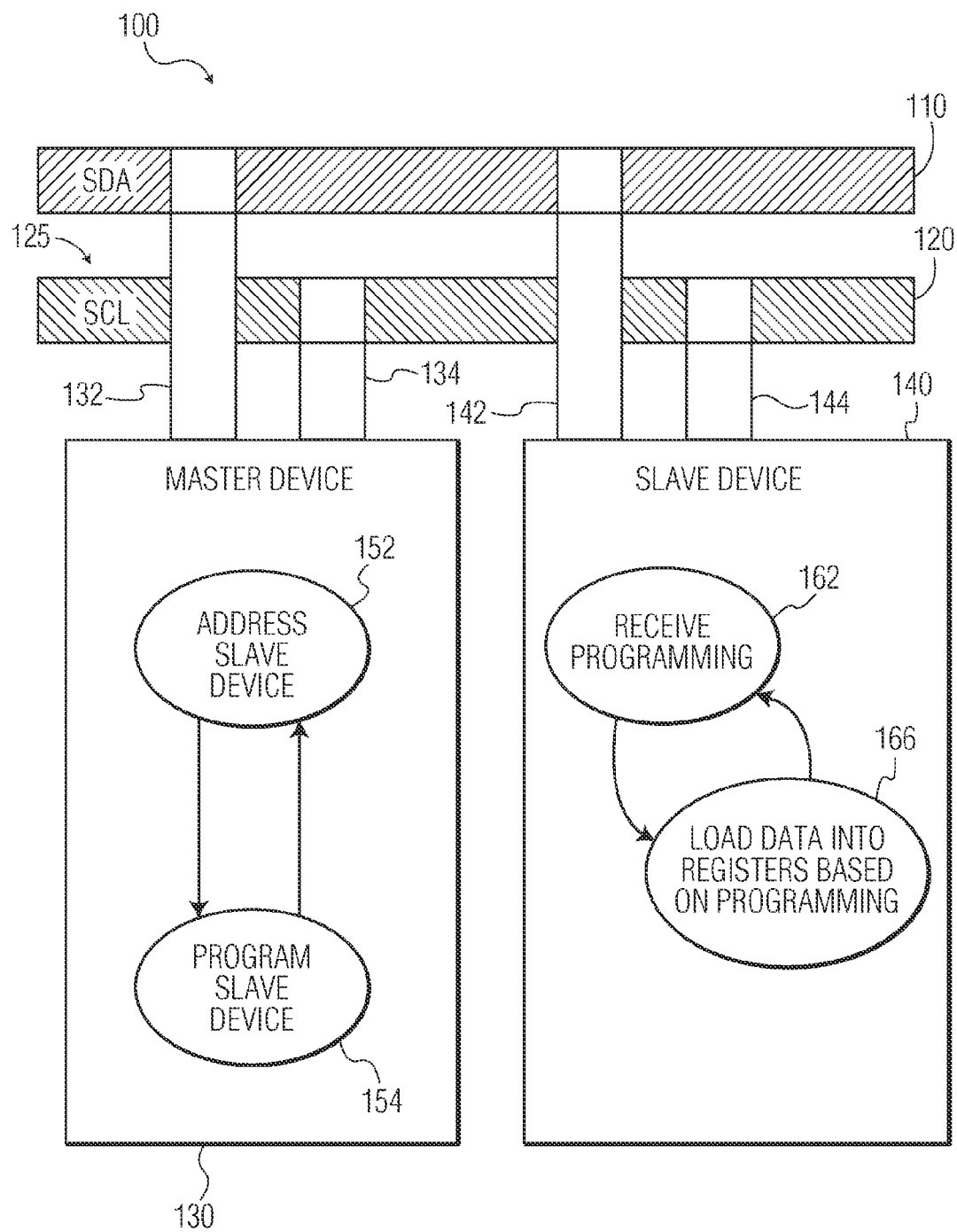
FIG. 1 is a block diagram of a data communications system implementing programming of multiple banks of I/O in an I2C slave device simultaneously with the same logic value in accordance with embodiments of the present invention.

FIG. 1 is a block diagram of a data communications system 100 implementing programming of multiple banks of I/O in an I2C slave device simultaneously with the same logic value in accordance with embodiments of the present invention. An SDA line 110 and an SCL line 120 are arranged as an I2C data bus 125. A master device 130 and a slave device 140 are attached to the I2C data bus 125. The master device 130 is electrically connected to the I2C data bus 125 using a clock connection 134 and a data connection 132 electrically connected to the SCL line 120 and the SDA line 110 respectively.

The slave device 140 is electrically connected to the I2C data bus 125 using a clock connection 144 and a data connection 142 electrically connected to the SCL line 120 and the SDA line 110 respectively. The master device 130 addresses 152 the slave device 140, and programs 154 the slave device to operate in a particular configuration, to load registers one at a time, or in parallel, for example.

The slave device 140 receives 162 the program 154, such as by placing a word in a register that designates the configuration of output port registers of the slave device 140. The slave device then loads 166 the output port registers, selected via the programming 162, simultaneously with a single logic value (e.g. logic 0 or logic 1) such as is described above with reference to Table 1.

For example, the slave device may be configured as a GPIO device having 20 I/O pins used to drive 5 seven-segment displays. The 20 pins may be allocated into 5 banks of 4 pins, and each bank may be associated with an output port register that is used to contain a BCD data word to drive a seven-segment display coupled to an output port. The configuration register may be used to indicate which of the 5 banks are to update with a single logic value, where the other banks are to wait for future loading. In this manner, all the designated output port registers may be reset to logic 0 or logic 1 with a reduced bandwidth of data transmitted through the bus to reset the seven-segment displays.

Figure 2:
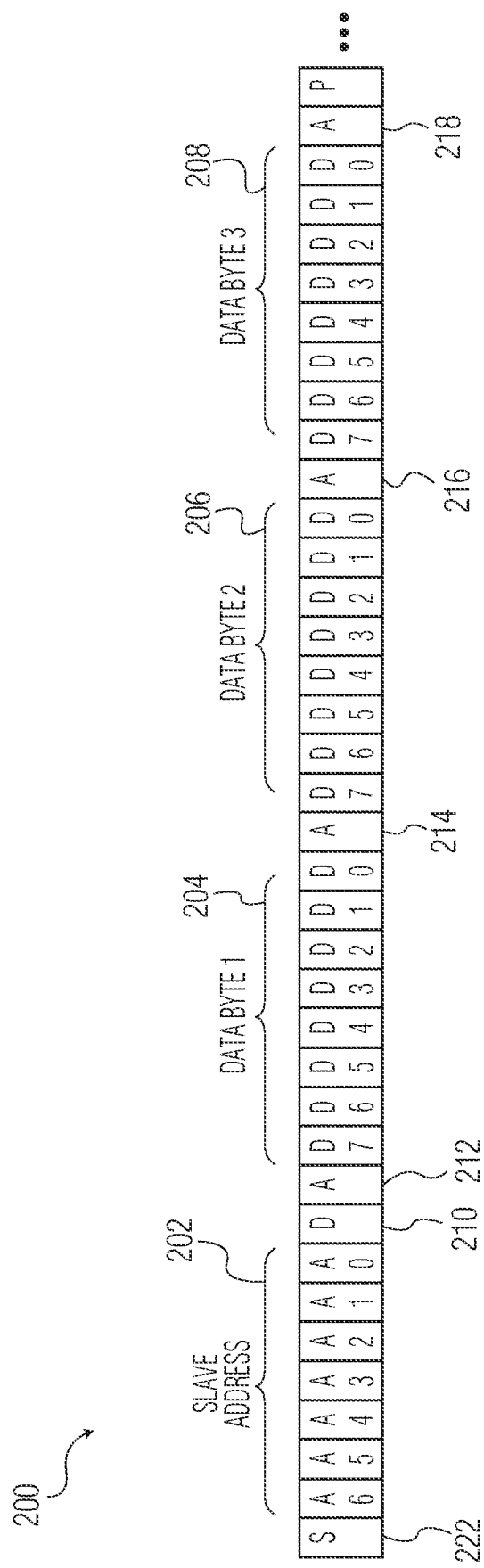
FIG. 2 is an illustration of a data stream for a data communications system implementing programming of multiple banks of I/O in an I2C slave device simultaneously with the same logic value in accordance with embodiments of the present invention.

FIG. 2 is an illustration of a serial data stream 200 for a data communications system implementing programming of multiple banks of I/O in an I2C slave device simultaneously with the same logic value in accordance with embodiments of the present invention. The serial data stream 200 is illustrated in FIG. 2 consistent with an I2C communications protocol. A slave address 202 follows a START condition 222 transmitted by a master on an I2C bus. The slave address 202 is followed by a READ/WRITE bit 210, and a subsequent ACKNOWLEDGE signal 212 from the slave device. The READ/WRITE signal 210 is illustrated in FIG. 2 as a logic 0, indicating a write from the master to the slave. A first data byte 204, second data byte 206, and a third data byte 208 are transmitted by the master device, each data byte 204, 206, 208 followed by a respective ACKNOWLEDGE 214, 216, 218 from the slave device.

In an example embodiment, the data byte 204 may be used to program a configuration register in the slave device, such as is described above, to load 24 bits of output with a logic 1. In this example embodiment, the data bytes 206, 208 are not needed to update all 24 bits, because the data byte 204 may be used to simultaneously load all 24 bits. In another illustrative example, the data bytes 204, 206, 208 may be sent serially to three 8-bit output port registers each connected in parallel to a serial data bus within the slave device, thereby requiring all three bytes to update the 24 bits.

FIG. 3 is a block diagram of a system 300 implementing programming of multiple banks of I/O in an I2C slave device simultaneously with the same logic value in accordance with embodiments of the present invention. A slave device 320 is connected to an I2C bus 310. The slave device 320 is illustrated in FIG. 3 as a GPIO device. The slave device 320 may include input circuitry 360 to direct and/or control the assembly and flow of data from the I2C bus 310. The input circuitry 360 is illustrated in FIG. 3 as directing data from the I2C bus 310 into a configuration register 370.

The input circuitry 360 is also coupled to output port registers 331-338. The input circuitry 360 is coupled to the output port registers 331-338 in parallel, such that the same data is available to each output port register 331-338 concurrently. For example, the input circuitry 360 may be coupled to output port registers 331-338 using a serial bus such as an I2C bus, using a parallel data bus, or using another logic flow scheme. In one specific example, the output port registers 331-338 may be configured as 4-bit registers, with each output port register 331-338 connected in parallel to 4 data lines, constituting a 4-bit data bus. In another specific example, the output port registers 331-338 may be configured as 4-bit registers, with each group of two output port register (331, 332), (333-334), (335,336), and (337,338) connected in parallel to 2 lines (plus ground), constituting an I2C bus architecture. The slave device 320 may incorporate any number or configuration of output port registers and/or output port drivers.

The output port registers 331-338 illustrated in FIG. 3 are coupled to output port drivers 341-348 respectively, which are coupled to seven-segment displays 351-358 respectively. In this arrangement, the output port registers 331-338 may be loaded, one at a time or in parallel, in accordance with the present invention, to drive the seven-segment displays 351-358.

The configuration register 370 is configured to be programmed, using the I2C bus 310 communications protocol, to select one or more slave device configurations. The output port registers 331-338 are configured to receive data provided by the input circuitry 360, wherein each register of the output port registers 331-338 loads a single logic value in parallel with other of the output port registers 331-338, or one at a time, based on the slave device configuration selected by the configuration register 370.

FIG. 4 is a flow chart of a method 400 for implementing programming of multiple banks of I/O in an I2C slave device simultaneously with the same logic value in accordance with embodiments of the present invention. The method 400 involves a slave device, such as a GPIO device, updating at least two banks of output port registers in the slave device, either one at a time, or in parallel with other of the at least two banks of output port registers, based on the slave device configuration selected by a programmable configuration register.

The method involves programming 410 the slave device for a particular configuration, such as by using a configuration register in the slave device. The programming may be performed using an I2C communications protocol, to designate whether the output port registers of the slave device are to update sequentially or to update in parallel. If a configuration 415 is for serial loading, serial data is received 420 using a serial data transfer bus, such as an I2C bus. The output port registers are loaded 430, each registers updating one at a time relative to other registers, based on the programming 410.

If the configuration 415 is for parallel loading, a single logic value, indicated by the programming 410, is loaded into all selected registers simultaneously 440. The use of a GPIO device as the slave device implementing the method 400 is for purposes of illustration only, and not for limitation.

Hardware, firmware, software or a combination thereof may be used to perform the various embodiments of programming multiple banks of I/O in an I2C slave device simultaneously with the same logic value as described herein. The master device functionality used in connection with the invention may reside in an I2C master device as described, or may alternatively reside on a stand-alone or networked computer attached to the serial data communications system 100. The serial data communications system 100 illustrated in FIG. 1 is an example structure that can be used in connection with such communications systems, computers, or other computer-implemented devices to carry out operations of the present invention.

The example master device 130 and/or slave device 140 illustrated in FIG. 1, suitable for performing the programming in accordance with the present invention, typically includes a central processor (CPU) coupled to random access memory (RAM) and/or some variation of read-only memory (ROM). The ROM may also be other types of storage media to store programs, such as programmable ROM (PROM), erasable PROM (EPROM), etc. The processor may communicate with other internal and external components through input/output (I/O) circuitry and/or other bussing, to provide control signals, communication signals, and the like.

The master device 130 and/or slave device 140 may also include one or more data storage devices, including hard and floppy disk drives, CD-ROM drives, and other hardware capable of reading and/or storing information, such as DVD, etc. In one embodiment, software for carrying out programming of multiple banks of I/O in an I2C slave device simultaneously with the same logic value in accordance with the present invention may be stored and distributed on a CD-ROM, diskette, or other form of media capable of portably storing information. These storage media may be inserted into, and read by, devices such as a CD-ROM drive, the disk drive, etc. The software may also be transmitted to the computing arrangement via data signals, such as being downloaded electronically via a network, such as the Internet. Further, as previously described, the software for carrying out the functions associated with the present invention may alternatively be stored in internal memory/storage of the computing device, such as in the ROM.

Any resulting program(s), having computer-readable program code, may be embodied within one or more computer-usable media such as memory devices or transmitting devices, thereby making a computer program product or article of manufacture according to the invention. As such, the terms "computer readable medium," "article of manufacture," "computer program product" or other similar language as used herein are intended to encompass a computer program which exists permanently, temporarily, or transitorily on any computer-usable medium such as on any memory device or in any transmitting device.

Each feature disclosed in this specification (including any accompanying claims, abstract, and drawings), is replaceable by alternative features having the same, equivalent or similar purpose, unless expressly stated otherwise. Thus, unless expressly stated otherwise, each feature disclosed is one example only of a generic series of equivalent or similar features.

The present invention should not be considered limited to the particular examples described above. Various modifications, equivalent processes, as well as numerous structures to which the present invention may be applicable fall within the scope of the present invention. For example, embodiments of programming multiple banks of I/O in an I2C slave device simultaneously with the same logic value in accordance with the present invention can be implemented using a similarly constructed one-way or two-way interface for communication between devices on a common bus, such as an SMBus or other bus arrangement. Such variations may be considered as part of the claimed invention, as fairly set forth in the appended claims.

What is claimed is:

1. In a communications system using a serial data transfer bus that has a serial data line and a clock line used to implement a communications protocol, a slave device, comprising:
   a plurality of interface port registers, each interface port register comprising a plurality of bits, each interface port register configured to load data therein received in accordance with the communications protocol over the data transfer bus in a first configuration, and to load a single logic value into the plurality of bits in a second configuration; and
   a programmable configuration register configured to be programmed, in accordance with the communications protocol over the data transfer bus, to select two or more of the plurality of interface port registers for loading of the single logic value into the plurality of bits of the selected interface port registers in the second configuration.

2. The device of claim 1, wherein the configuration register is configured as an 8-bit register, wherein 1-bit is used to select the single logic value, and wherein 5-bits are used to select interface port registers desired for loading of the single logic value.

3. The device of claim 1, wherein the slave device is configured as a general purpose input/output device.

4. The device of claim 1, wherein the slave device is configured to conform to an SMBus serial communication protocol.

5. The device of claim 1, wherein the slave device is configured as a general purpose input/output device comprising a plurality of pins, each pin associated with a bit of the plurality of bits, the plurality of pins divided into banks of output drivers, wherein each bank of output drivers is associated with one of the interface port registers.

6. The device of claim 5, wherein the banks of output drivers are configured to drive light emitting diodes.

7. The device of claim 5, wherein the banks of output drivers comprise four pins configured to drive seven-segment displays.

8. In a communications system using an I2C serial data transfer bus that has a serial data line and a clock line used to implement a communications protocol, a method for a master device to load data into at least two interface port registers in a slave device, comprising:
   programming a configuration register in the slave device, in accordance with the communications protocol over the data transfer bus, to select at least two interface port registers from a plurality of selectable interface port registers;
   selecting a logic value; and
   loading the selected logic value into each of the selected at least two interface port registers concurrently.

9. The method of claim 8, comprising driving a light emitting diode using an output port associated with the port register.

10. The method of claim 8, comprising driving a seven-segment display using an output port associated with the port register.

11. The method of claim 8, wherein the serial data transfer bus further conforms to an SMBus serial communication specification.

12. The method of claim 8, wherein the slave device is configured as a general purpose input/output device.

13. A computer-readable medium having computer-executable instructions for a master device to concurrently load a selected logic value into at least two interface port registers in a slave device, the computer-executable instructions performing steps comprising:

programming a configuration register in the slave device, in accordance with the communications protocol over the data transfer bus, to select at least two interface port registers from a plurality of selectable interface port registers;

selecting a logic value; and loading the selected logic value into each of the selected at least two interface port registers concurrently.

14. The computer-readable medium of claim 13, wherein the computer-executable instructions conform to an SMBus serial communication protocol.

15. An I2C slave device, comprising:

means for programming a configuration register in the slave device, in accordance with the communications protocol over the data transfer bus, to select at least two interface port registers from a plurality of selectable interface port registers;

means for selecting a logic value; and means for loading the selected logic value into each of the selected at least two interface port registers concurrently.

16. The device of claim 15, comprising means for driving a light emitting diode using the interface port registers.

17. The device of claim 15, comprising means for driving a seven-segment display using the interface port registers.

* * * * *